US006345748B1

(12) United States Patent
Chimenti et al.

(10) Patent No.: US 6,345,748 B1
(45) Date of Patent: Feb. 12, 2002

(54) BICYCLE CARRIER ADAPTED TO BE MOUNTED ON THE BACK OF A VEHICLE

(75) Inventors: Thomas A. Chimenti, New Canaan, CT (US); Daniel K. Ng, Somers; Raymond R. Raaber, Tuckahoe, both of NY (US)

(73) Assignee: Industri AB Thule, Hillerstorp (SE)

( * ) Notice: Subject to any disclaimer, the term of this patent is extended or adjusted under 35 U.S.C. 154(b) by 0 days.

(21) Appl. No.: 09/641,054

(22) Filed: Aug. 17, 2000

Related U.S. Application Data

(60) Continuation of application No. 09/179,114, filed on Oct. 26, 1998, now abandoned, which is a continuation of application No. 08/019,700, filed on Feb. 19, 1993, now Pat. No. 5,826,767, which is a division of application No. 07/829,282, filed on Feb. 3, 1992, now Pat. No. 5,211,323.

(51) Int. Cl.[7] .................................................. B60R 9/00
(52) U.S. Cl. ....................... 224/324; 224/314; 224/318; 224/325; 224/326
(58) Field of Search ................................ 224/314, 318, 224/323, 324, 325, 326; 248/62, 63, 68.1, 73, 74.3; 211/19, 20

(56) References Cited

U.S. PATENT DOCUMENTS 4,681,247 A * 7/1987 Prosen ................... 224/324 X
4,779,828 A * 10/1988 Munch ....................... 248/74.3
4,817,901 A * 4/1989 Kuo ....................... 248/74.3 X
4,875,647 A * 10/1989 Takagi et al. ............... 248/74.3
4,944,005 A * 7/1990 Van Dyke .............. 248/74.3 X
5,135,145 A * 8/1992 Hannes et al. ............... 224/314

FOREIGN PATENT DOCUMENTS

DE          3217319 A1 * 5/1982      ............. 224/310 X

* cited by examiner

Primary Examiner—Gregory M. Vidovich
Assistant Examiner—Maerena W. Brevard
(74) Attorney, Agent, or Firm—Kilpatrick Stockton LLP

(57) ABSTRACT

A bicycle carrier is adapted to be mounted on the rear of a vehicle. The carrier comprises first and second mounting members and a pair of horizontally spaced bicycle supporting arms connected to the mounting members. The mounting members are pivotably connected for relative rotation about a horizontal pivot axis between a plurality of adjusted positions. The carrier includes indicia corresponding to each of the adjusted positions of the mounting members, so that a user can quickly return the carrier to the same adjusted position. The supporting arms carry cradles formed of an elastic material for receiving a bicycle. Each cradle includes a curved supporting surface for receiving a bar of the bicycle frame, and an integral strap which can be extended over the bar to retain the bar within the cradle. An anti-sway bar hangs downwardly from at least one of the supporting arms for resisting swinging movement of a bicycle.

7 Claims, 5 Drawing Sheets

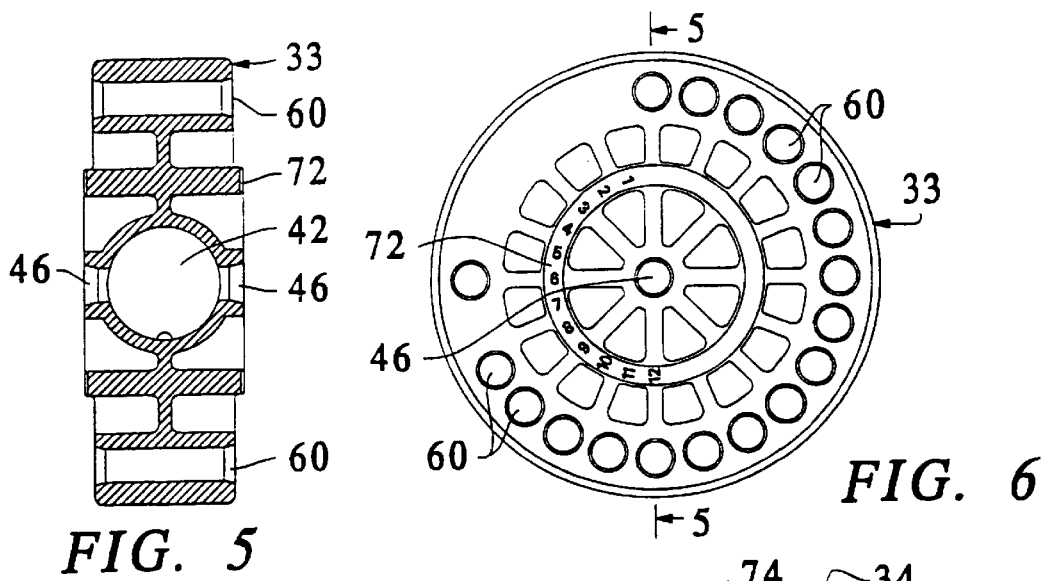
FIG. 5
FIG. 6
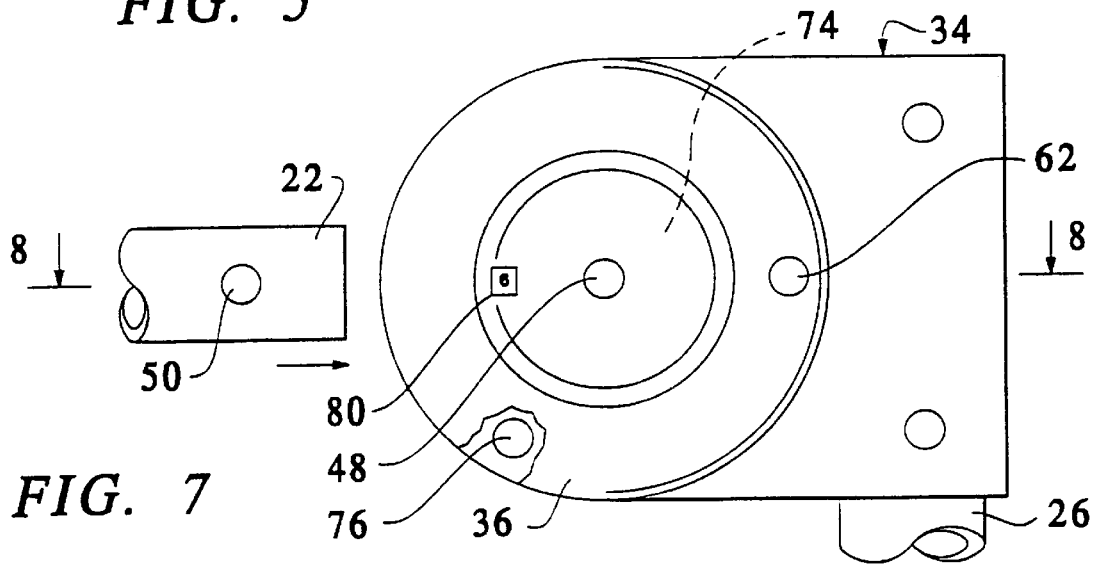
FIG. 7
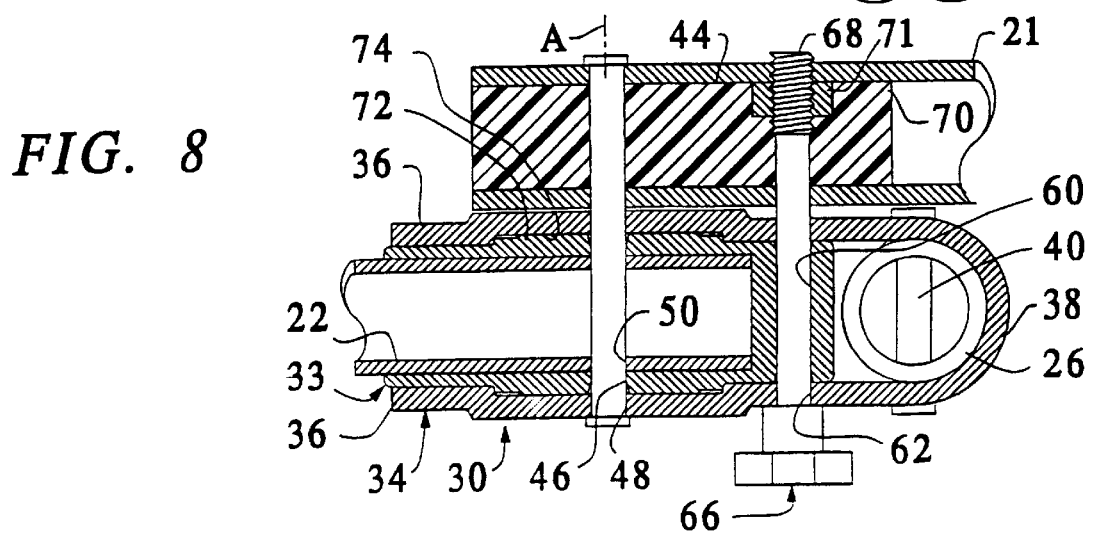
FIG. 8

BICYCLE CARRIER ADAPTED TO BE MOUNTED ON THE BACK OF A VEHICLE

RELATED PATENT APPLICATIONS

This is a continuation patent application of U.S. application Ser. No. 09/179,114 filed Oct. 26, 1998, now abandoned entitled BICYCLE CARRIER ADAPTED TO BE MOUNTED ON THE BACK OF A VEHICLE which is a continuation application of application ser. No. 08/019,700 filed Feb. 19, 1993 entitled BICYCLE CARRIER ADAPTED TO BE MOUNTED ON THE BACK OF A VEHICLE and now issued as U.S. Pat. No. 5,826,767 which is a division of application Ser. No. 07/829,282 filed Feb. 3, 1992 entitled BICYCLE CARRIER ADAPTED TO BE MOUNTED ON THE BACK OF A VEHICLE and now issued as U.S. Pat. No. 5,211,323; said applications in their entireties are hereby expressly incorporated by reference into the present application.

TECHNICAL FIELD

The present invention relates generally to bicycle carriers, and more specifically to the carriers which are mounted on the back of a vehicle.

BACKGROUND ART

The present invention relates to bicycle carriers adapted to be mounted on the backs of vehicles. Bicycle carriers of that type are conventional, e.g., see U.S. Pat. Nos. 3,710,999; 3,927,811; 4,332,337; 4,428,516; 4,513,897; and 4,830,250. It is common for a carrier to have first and second U-shaped mounting members which are seatable against upper and lower portions of the rear end of a vehicle, respectively. The carrier is attached to the vehicle by means of straps which are connected to the carrier and which carry hooks adapted to grasp portions of the vehicle. The mounting members are pivotable relative to one another. Consequently, the angle formed between the mounting members can be adjusted to enable the carrier to fit different vehicle configurations. A pair of supporting arms project rearwardly for receiving a bicycle. The supporting arms include bent ends or adjustable brackets which form cradles on which a bar of the bicycle frame is laid.

Prior art carriers have exhibited certain shortcomings. For example, although the angle formed by the mounting members can be adjusted to enable the carrier to be mounted on vehicles of different configurations, it may be necessary for the user to experiment with various angles in order to determine which angle is appropriate. Such time-consuming procedure may be required every time that the carrier is re-attached to the same vehicle or switched between different vehicles.

Furthermore, in the event that a user attempts to mount more than one bicycle on the carrier, the bicycles may tend to swing toward and away from one another as the vehicle is in motion, thereby repeatedly clashing with one another.

Also, the frame of the bicycle may tend to become scratched by metal-to-metal contact with the cradles.

It would be desirable to provide a bicycle carrier which can be mounted on the rear of a vehicle and which alleviates the above-explained shortcomings as well as others.

In view of the above described deficiencies associated with the use of known designs for bicycles carriers, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed rear mounted bicycle carriers and incorporates several additionally beneficial features.

Such a bicycle carrier is provided by the present invention, the carrier comprising first and second mounting members and a pair of horizontally spaced bicycle supporting arms connected to the mounting members for receiving at least one bicycle. A securing mechanism is provided for securing the mounting members to the rear end of a vehicle. A pivot-forming arrangement is provided which forms a pivot connection between the mounting members to enable the mounting members to pivot relative to one another about a generally horizontal pivot axis between a plurality of adjusted positions for adjusting an angle formed between the mounting members. The pivot-forming arrangement includes indicia corresponding to each of the adjusted positions of the mounting members, and means for indicating the respective indicia when the mounting members are in each of the adjusted positions.

Preferably, each of the mounting members is U-shaped and comprises a pair of legs. The pivot-forming mechanism comprises a pair of first brackets connected to the legs of the first mounting member, and a pair of second brackets connected to the legs of the second mounting member. Each of the first brackets is pivotably connected to one of the second brackets to define generally horizontal pivot axis. The indicia are disposed on one of the brackets and are visible through an opening formed in another of the brackets.

Another aspect of the invention involves a bicycle carrier comprising a mounting frame, and a pair of bicycle supporting arms projecting rearwardly from the mounting frame. At least one cradle is mounted on each of the supporting arms for cradling a bicycle frame. Each of the cradles is formed of a flexible material and includes a base mounted on a respective supporting arm, and a retaining strap. The base forms a bicycle-engaging surface and includes first fastening means. The strap is arranged to be extended across the bicycle-engaging surface to retain a bicycle frame thereon. The strap includes a second fastening means engageable with the first fastening means for fastening the strap in its bicycle frame-retaining position.

Preferably, the base and strap are of one-piece construction, and the first fastening means comprises a tab, and the second fastening means comprises a plurality of apertures.

Still another aspect of the invention involves a bicycle carrier comprising a mounting frame and a pair of bicycle supporting arms projecting rearwardly from the mounting frame. Each of the supporting arms has cradling means for supporting at least one bicycle. An anti-sway bar hangs downwardly from at least one of the supporting arms for resisting swinging movement of a bicycle. The anti-sway bar can be positioned between two bicycles mounted onto the supporting arms in order to prevent bicycle-to-bicycle contact during movement of the vehicle. Alternatively, the anti-sway bar can resist the rearward swinging of a single bicycle mounted on the carrier.

Preferably, a lower end of the anti-sway bar is hook-shaped, and configured to snap onto the other supporting arm when the carrier is stored.

The beneficial effects described above apply generally to the exemplary devices and mechanisms disclosed herein of the rear mounted bicycle carriers. The specific structures through which these benefits are delivered will be described in detail hereinbelow.

BRIEF DESCRIPTION OF THE DRAWINGS

The invention will now be described in greater detail in the following way of example only and with reference to the attached drawings, in which:

FIG. 5 is a cross-sectional view taken through the hub along the line 5—5 in FIG. 6;

FIG. 6 is a side elevational view of the hub depicted in FIG. 3;

FIG. 7 is a side elevational view of a portion of the carrier which forms a pivot connection between two mounting members of the carrier;

FIG. 8 is a sectional view taken along the line 8—8 in FIG. 7 after a leg of an upper mounting member has been inserted into a hub of the pivot-forming mechanism;

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other.

Figure 1:
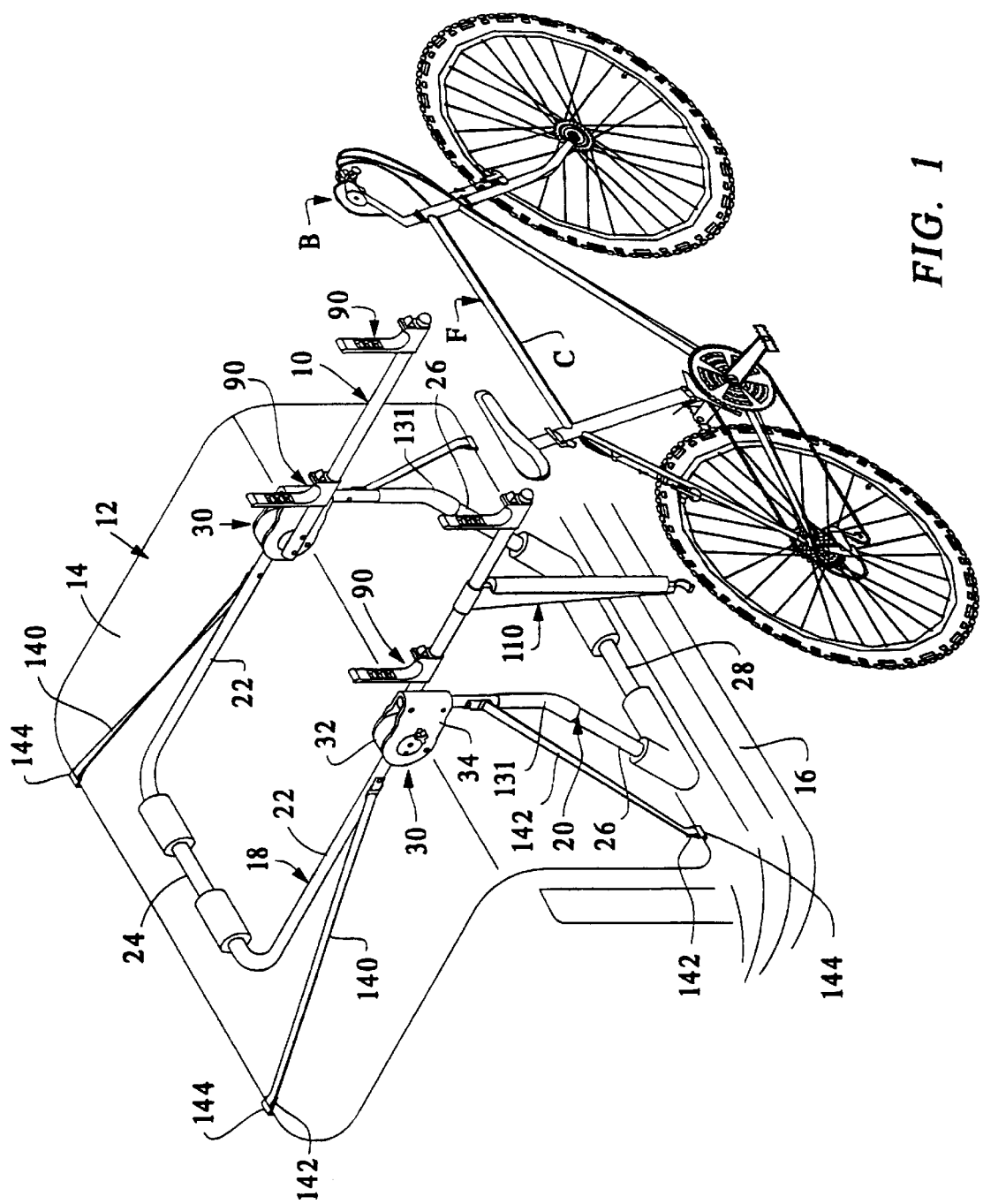
FIG. 1 is a perspective view of a bicycle carrier according to the present invention mounted on the rear end of a vehicle.

A bicycle carrier 10 according to the present invention is depicted in FIG. 1 as mounted on the rear of a vehicle 12. The vehicle 12 includes a trunk lid 14 and a bumper 16.

The carrier 10 comprises a frame formed by a pair of mounting members 18, 20, and a pair of bicycle supporting arms 21, 21' project rearwardly from the frame. An upper one of the mounting members 18 is U-shaped and comprises a pair of leg portions 22 interconnected by a bight portion 24. Likewise, a lower one of the mounting members 20 is U-shaped and includes a pair of leg portions 26 interconnected by a bight portion 28.

The mounting members are interconnected by two pivot-forming structures 30, each of which includes first and second brackets 32, 34. The first bracket 32 is affixed to the upper mounting member 18, and the second bracket 34 is affixed to the lower mounting member 20.

Figure 10:
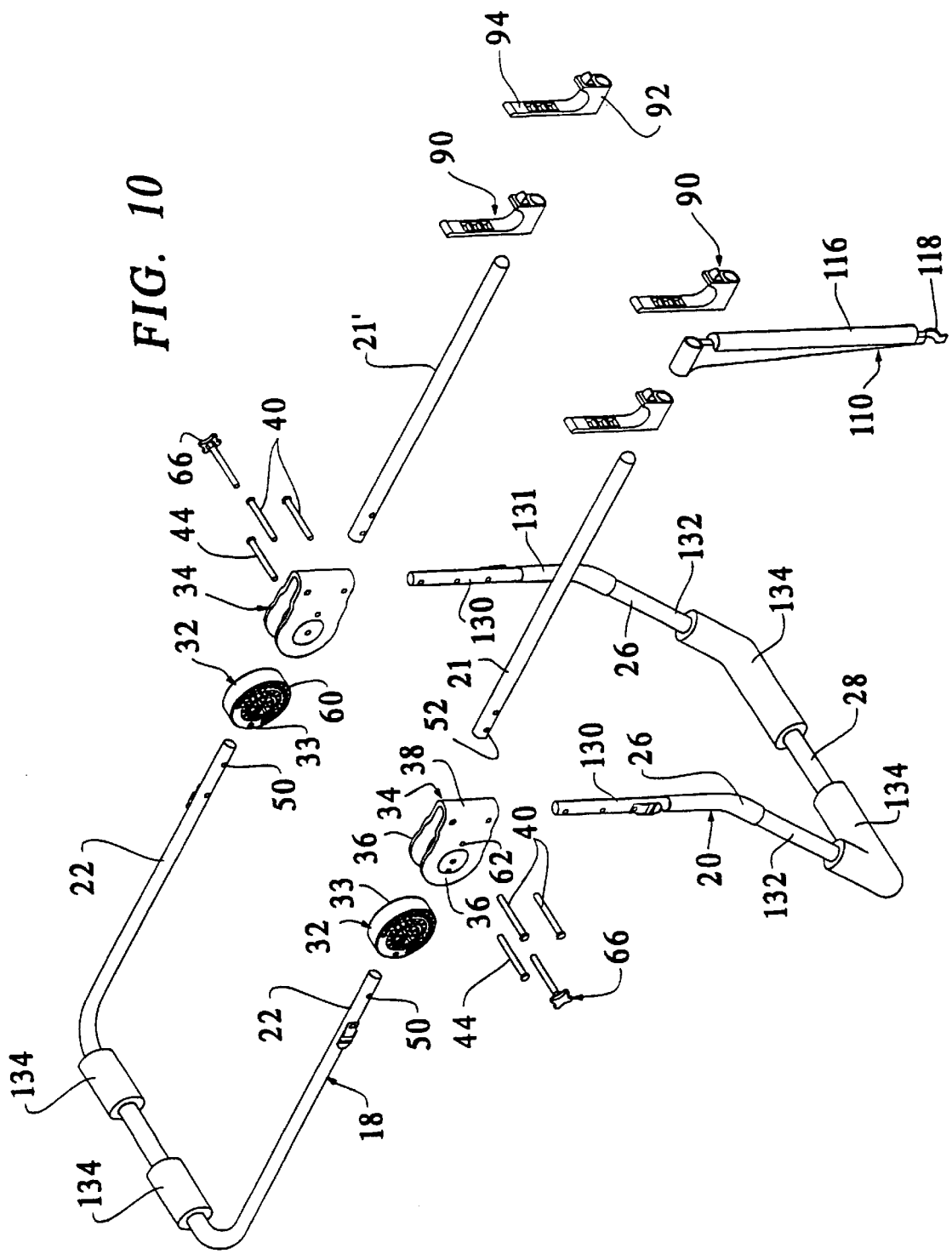
FIG. 10 is an exploded perspective view of the bicycle carrier depicted in FIG. 2.

The second bracket 34 is U-shaped and includes a pair of leg portions 36 (see FIGS. 8 and 10) interconnected by a bight portion 38. The bight portions 38 forms a socket which receives the upper end of a leg portion 26 of the lower mounting member 20 and retains the leg portion by means of pins in the form of rivets 40 which pass through aligned holes in the leg 26 and leg portion 36.

Figures 3, 4:
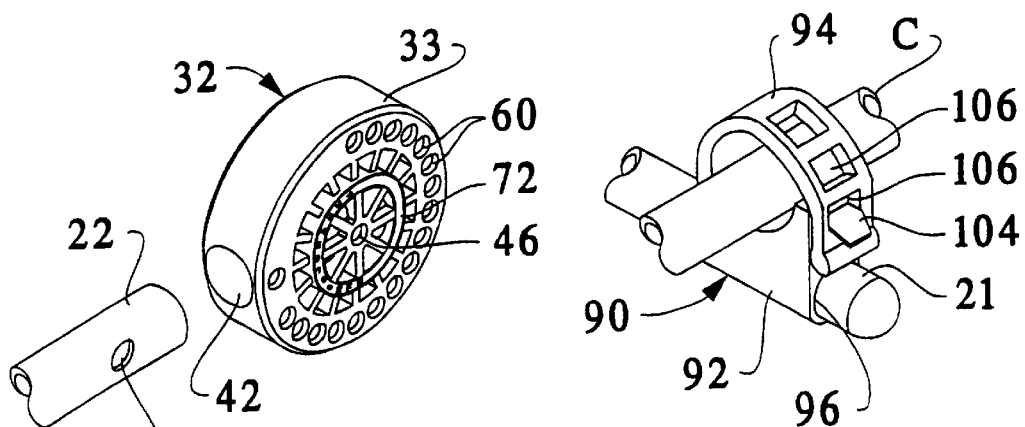
FIG. 3 is a perspective view of a hub portion of the carrier, and a fragment of a leg of a mounting member which is to be inserted into a socket of the hub.
FIG. 4 is a fragmentary perspective view of a cradle according to the present invention, the cradle being in a bicycle frame-retaining condition.

Each of the first brackets 32 comprises a generally cylindrical hub 33 having a radially extending socket portion 42 for receiving a leg portion 22 of the upper mounting member 18 (see FIG. 3). A pin in the form of a bolt 44 extends through aligned openings 46, 48, 50, 52 formed in the hub 33, the bracket 34, the leg 22, and the supporting arm 21 (or 21'), respectively, as shown in FIG. 8. The pin forms a pivot axis A about which the hub 33 can rotate relative to the bracket 34.

An internal wall of the socket 42 could include a projection (not shown) sized to enter a groove formed in an outer wall of the leg to aid in properly aligning the leg within the socket. The hub 33 includes a plurality of through-holes 60 (see FIG. 6) arranged in a circular path concentrically about the pivot axis A. The legs 36 of the bracket 34 include two aligned holes 62 (see FIGS. 7 and 8) spaced from the axis A by the same distance as the holes 60. Hence, by rotating the hub 33 about the axis A, the holes 60 can be brought sequentially into alignment with the aligned holes 62. By inserting a threaded bolt 66 through the aligned holes 62, 60 and into a threaded hole 68 disposed within the supporting arm 21 (or 21'), the mounting members 18, 20 will be locked in a particular adjusted position. The number of possible positions of adjustment corresponds to the number of holes 60. In contrast, the supporting arms 21, 21' have only one operating or use position. The threaded hole 68 can be provided in the supporting arm 21 (or 21') in any convenient fashion, such as by means of a polypropylene plug 70 affixed within the supporting arm 21. The plug 70 includes holes through which the rivet 44 and bolt 66 extend, and carries a threaded nut 71 which receives the bolt 66.

Figure 9:
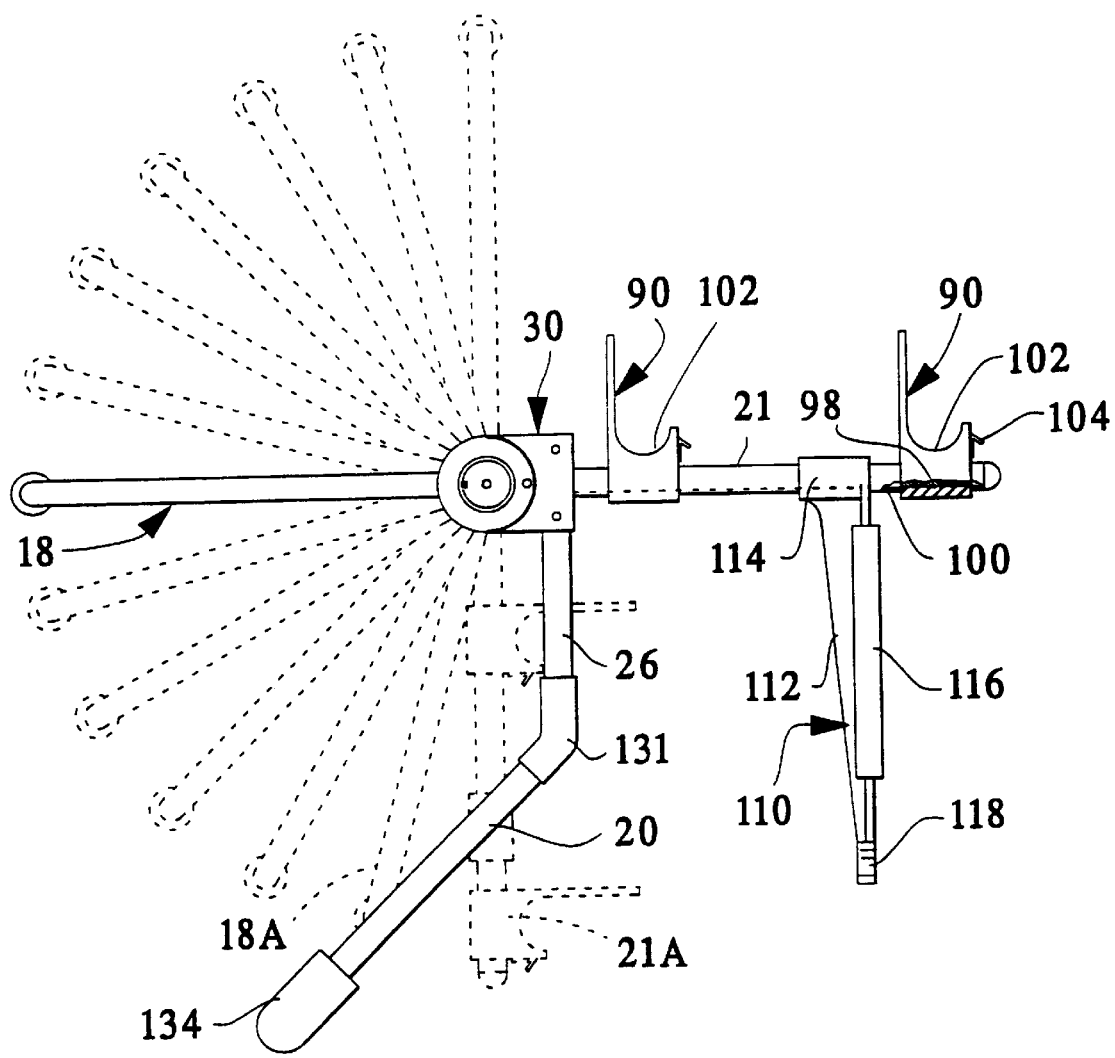
FIG. 9 is a side elevational view of the carrier, depicting various positions of adjustment of the carrier in broken lines.

The hole 62 of the bracket 34 and the hole 68 of the supporting arm 21 are located such that when the supporting arms 21, 21' are in their use position, they are oriented substantially perpendicular to the upper portions of the legs 26 of the mounting member 20 as the carrier is viewed from the side in a direction parallel to the axis A (see FIG. 9).

Rotational support for the hub 33 within the bracket 34 is enhanced by the engagement between a circular projection 72 formed on each of the outer surfaces of the hub, and a circular recess 74 formed in each of the inner surfaces of the bracket legs 36 (see FIG. 8). The engagement between those projections and recesses 72, 74 forms a rotary support between the hub 33 and bracket 34.

In order to enable alignment between the holes 60 of the hub 33 and the holes 62 of the bracket to be more easily attained, each of the inside surfaces of the bracket 34 is provided with a projection 76 which is spaced from the axis A by the same distance as the holes 60 of the hub are spaced from that axis. In FIG. 7 a part of one of the legs 36 is broken away to show the projection 76 located on the opposite leg 36. Thus, as the hub 32 rotates, the holes 60 will sequentially become aligned with, and receive, the projections 76. The projections do not lock the hub in its various positions of adjustment, but merely offer a yieldable resistance against further hub rotation. The projections 76 are located such that when they are nested within one of the holes 60, another of the holes 60 will be aligned with the holes 62 of the bracket, as depicted in FIG. 8, thus facilitating insertion of the bolt 66 to lock the carrier in that particular adjusted position.

It will be appreciated that when relative rotation about axis A occurs between the upper and lower mounting members 18, 20, such as when changing from one adjustment position to another, the angle formed between those mounting members changes, as is evident from FIG. 9 which depicts various adjusted positions of the carrier in broken lines. In so doing, the carrier 10 is capable of being mounted on the rears of vehicles of different configurations. Thus, each position of adjustment is suited to one or more particular vehicle model. When a user attempts to re-attach the carrier to a vehicle, or transfer the carrier from one vehicle to another, it would be highly inconvenient to have to repeat the time-consuming procedure of experimenting with different adjustment positions of the carrier.

In order to avoid that inconvenience, the present invention provides means for identifying the various adjustment positions. As depicted in FIG. 6, indicia in the form of a series of numbers, i.e., numbers 1 through 12, is disposed on one of the sides of the hub 33. Those numbers are arranged in a circular path which is concentric with the axis A. One of the legs 36 of the bracket 34 includes an opening 80 (see FIG. 7) which is spaced the same distance from the axis A as are the numbers formed on the hub. The opening is situated so that whenever the mounting members have been indexed to any one of their adjusted use position (excluding a storage position), a number is visible through the opening 80. For example, the number "6" is visible in FIG. 7.

The numbers can be provided in any suitable manner, such as by being integrally molded with the hub and then colored in an appropriate manner so as to be clearly distinguishable.

Hence, once a user has adjusted the carrier to suit a particular vehicle, the user need only record the particular position number which is disposed in the opening 80 in order to be able in the future to quickly return the carrier to the position suited to that vehicle. If the user owns a number of vehicles, then he will record the position numbers pertinent to each vehicle.

Furthermore, it is possible for the manufacturer of the carrier to provide the user with a listing which correlates various vehicle models to the position numbers. Hence, upon purchasing the carrier, the user can immediately index the carrier to its proper position without the need to experiment with different positions.

In order to support a bicycle B without scratching the frame, bicycle-receiving cradles 90 formed of an elastically flexible material, such as rubber or soft plastic, are provided to receive and cradle a bar C of the bicycle frame F. Each cradle 90 includes a base 92 and a strap 94 which are of integral, one-piece construction. The strap 94 normally extends substantially upwardly from the base 92 as shown in FIGS. 1, 2, 9 and 10, but can be flexed to extend across a bicycle receiving surface 102 of the cradle 90 to retain a bicycle frame, as shown in FIG. 4. The base 92 includes a through-hole 96 which is adapted to receive a supporting arm 21 (or 21'). The supporting arm makes a snug frictional fit with the hole 96, so the cradle 90 can be slid along the supporting arm and then be held in position by friction.

A wall of the through-hole 96 includes a projection 98 which is received in a longitudinal channel 100 formed in an outer surface of the supporting arm 21 (or 21'). The projection tends to retain the cradle in a prescribed circumferential position on the supporting arm, so that the bicycle-receiving surface 102 of the cradle faces upwardly.

That surface 102 is formed on the base 92 and is of curved shape to generally conform to the curvature of the bar C of the bicycle frame. The base 90 carries a metal fastener tab 104 which is disposed on a side of the surface 102 opposite that of the strap 94. The tab 104 can be mounted in the base in any suitable fashion.

The strap 94 includes a plurality of fastening holes 106 (see FIG. 4) which are sized to receive the tab 104. Thus, once the bar C of the bicycle frame has been placed onto the surfaces 102 of two of the cradles, the straps 94 are wrapped around the bar C and fastened to the tab 104, as depicted in FIG. 4. The bar C will be held in place without any metal-to-metal contact which could scratch the bar.

Two pairs of cradles 90 can be provided to enable two bicycles to be supported simultaneously on the supporting arms. During vehicle movement, there may occur a tendency for the bicycles to swing about axes defined by the bars C during movement of the vehicle. In order to prevent bicycle-to-bicycle contact during such swinging movement, there is provided an anti-sway bar 110. The anti-sway bar 110 comprises an arm 112 having a hollow sleeve 114 at its upper end. The sleeve 114 receives a supporting arm 21 to enable the anti-sway bar 110 to be slid longitudinally therealong. Disposed over a front face of the arm 112 is a cover 116 formed of a relatively soft material such as rubber or a soft plastic. At its lower end, the arm 112 is shaped like a hook 118. The anti-sway bar is positioned intermediate the front and rear pairs of cradles and hangs vertically downwardly such that if the bottom of a rear bicycle swings forward toward a front bicycle, the bottom of the rear bicycle will strike the soft cover 116 of the anti-sway bar 110. Consequently, damage to the bicycles as the result of bicycle-to-bicycle contact will be avoided.

The anti-sway bar 110 is longitudinally adjustable along the supporting arm 21 and the sleeve 114 is snugly engaged with the supporting arm 21. By applying sufficient force to the anti-sway bar 110 to overcome the frictional contact with the supporting arm, the position of the anti-sway bar can be changed.

Figure 2:
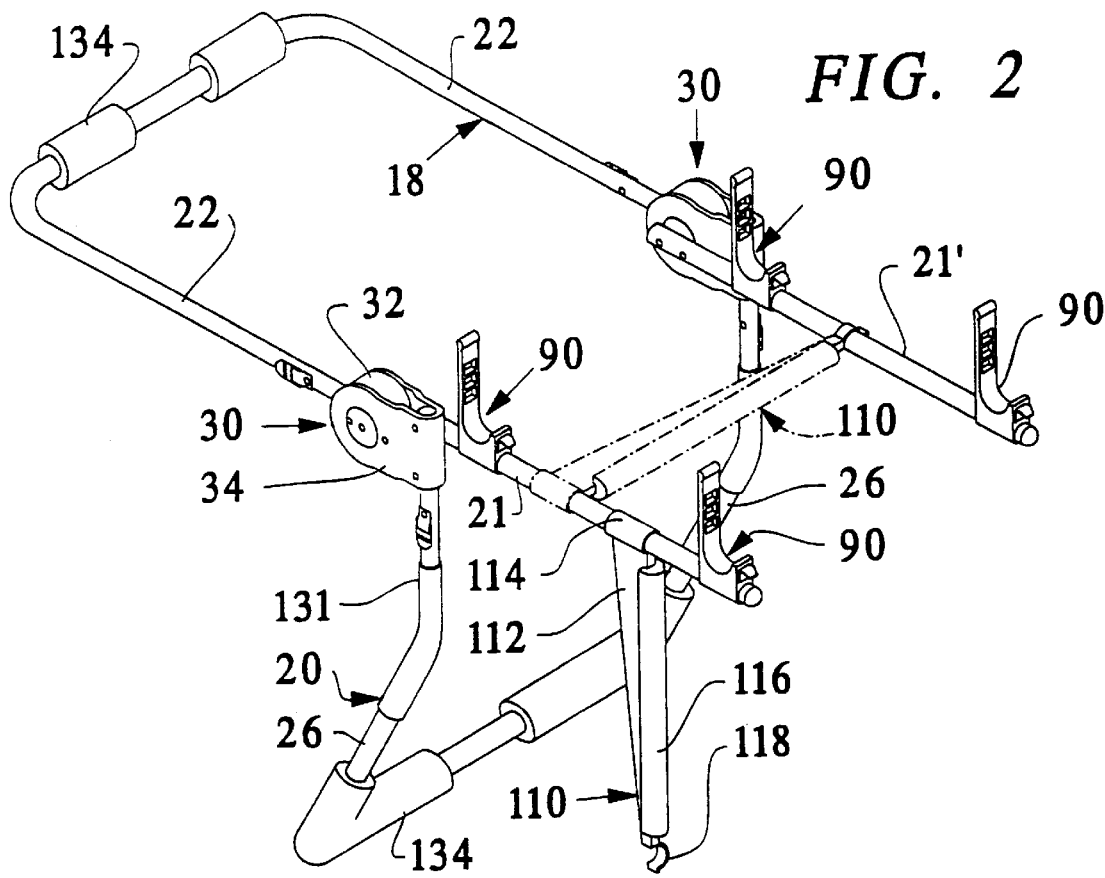
FIG. 2 is a perspective view of the bicycle carrier, with securing straps thereof being deleted for clarity, and with a anti-sway bar shown in phantom lines in a carrier-storing position.

For carrier-storage purposes, the anti-sway bar 110 can be swung about the axis of the supporting arm 21 until the hook 118 snaps onto the other supporting arm 21', as depicted in phantom lines in FIG. 2. Thus, the carrier will be rendered more compact for storage purposes than if the anti-sway bar 110 were permitted to hang free.

While the anti-sway bar 110 limits forward swinging movement of the rear bicycle, the upper portions 130 of the legs 26 of the lower mounting member 20 perform a similar function with respect to a front bicycle. When the carrier has been properly mounted on a vehicle, the upper portions 130 of the legs 26 will be oriented substantially vertically, and the supporting arms 21, 21' (which have only one use position) will be oriented substantially horizontally. Hence, the leg upper portions 130 will be conveniently suited to limit the forward swinging movement of the front bicycle. Pads 131 are provided on the legs 26 to prevent the bicycle from being damaged by the leg portions 130.

If desired, the legs 26 and the anti-sway bar 110 could be provided with straps to enable the front and rear bicycles to be attached to the legs 26 and anti-sway bar, respectively, to prevent swinging of the bicycles.

The lower portions 132 of the legs 26 are inclined inwardly and downwardly from the upper portions 130 to form obtuse angles therebetween. Hence, the bight portion 28 of the lower mounting member 20 will be properly located for engaging the rear bumper of the vehicle, as depicted in FIG. 1.

The vehicle-engaging portions of the carrier are provided with soft cushions 134 to prevent the vehicle from being scratched by the carrier.

The carrier is affixed to the vehicle by means of upper and lower securing an straps 140, 142 (see FIG. 1) which carry conventional hooks 144 and adjusting buckles 146. The hooks grasp portions of the vehicle body, such as edges of the trunk lid for example, and are drawn-up tight by means of the buckles. By loosening the straps at the buckles, the hooks can be easily removed.

To render the carrier more compact for storage purposes, the anti-sway bar 110 is swung to its position wherein the hook 118 snaps onto the supporting arm 21'. Then, the bolt 66 is removed to enable the mounting members 18, 20 and the supporting arms 21, 21' to be swung about the axis A so as to lie more closely together. Such a compact condition of the carrier can be visualized in FIG. 9 wherein the lower mounting member could occupy the solid line position shown therein; the upper mounting member could occupy the broken line position 18A; and the supporting arms could occupy the broken line position 21A. While the mounting portions 18, 20 cannot be folded so as to lie in the same plane, they can be folded sufficiently to cause the size of the carrier to be substantially reduced to provide for convenient storage.

Although, not essential, the bracket 34, and the hub 33 could be provided with holes that are aligned in the storage position and which are also aligned with the hole 68 of the supporting arms, so that the bolt 66 can be reinserted to hold the carrier in its storage position.

In operation, when a user desires to install the carrier 10, the bolt 66 is removed, and the frame 18, 20 of the carrier is adjusted to a position fitting a particular vehicle 12 by rotating the mounting member 18 about axis A so that when the carrier rests against the vehicle, the supporting arms 21, 21' extend substantially horizontally. Then the bolt 66 is reinserted, and the hooks 144 of the straps 140, 142 are positioned to grasp convenient edges of the vehicle body in a conventional manner.

The user may now observe and record the position or index number which appears in the opening 80 (FIG. 7), so that, in the future, the carrier can be quickly indexed to that same position. The manufacturer could provide a listing of vehicle models and the corresponding index numbers of the carrier, so that the user would never have to experiment with different positions of the frame.

Once the carrier has been installed, one or more bicycles 83 are mounted on the cradles 90. If two bicycles are to be mounted, the cradles 90 can be adjustably positioned along the supporting arms 21, 21' to space the front and rear pairs of cradles apart by a distance commensurate with the size of the bicycles.

The cradle straps 94 are then wrapped around the bar C of the bicycle frame F (FIG. 4) to provide 360 degree securement of that bar. Due to the soft, elastic nature of the cradle, the bicycle bar C will not contact metal so as to become scratched.

The anti-sway bar 110 (see FIG. 2) is positioned closely adjacent the rear bicycle to resist swinging of that bicycle during vehicle travel, and thereby prevent bicycle-to-bicycle contact.

When the carrier is removed from the vehicle and stored, the anti-sway bar 110 can be rotated to a convenient storage position (see broken lines in FIG. 2) wherein the hook 118 snaps onto the other supporting arm 21'.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

A bicycle carrier adapted to be mounted on the back of a vehicle*** and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A holder for a bicycle adapted to be mounted on a bicycle carrier, said holder comprising:

a cradle arranged to be mounted on a portion of a bicycle carrier support arm and said cradle being adapted for cradling a bicycle frame on a base of said cradle, said base having a substantially upwardly open bicycle-engaging surface; and a self-supporting and substantially upstanding retaining strap at least partially extending upwardly from said base and positioned away from said base in an open configuration thereby permitting a bicycle to be inserted onto said bicycle-engaging surface in said open configuration, said retaining strap being sufficiently flexible to be bent across said bicycle-engaging surface to retain a bicycle frame thereon, said strap including a fastener for fastening said retaining strap in a bicycle frame-retaining configuration.

2. A holder for substantially round-shaped bicycle frame member that is configured to be mounted on a bicycle carrier, said holder comprising:

a cradle arranged to be mounted on a substantially round-shaped bicycle carrier support arm and said cradle being configured to cradle a substantially round-shaped bicycle frame member on a base of said cradle, said base having a substantially upwardly open bicycle-engaging surface adapted to engage a substantially round-shaped bicycle frame member; and a self-supporting and substantially upstanding retaining strap at least partially extending upwardly from said base and positioned away from said base sufficiently to establish an open configuration thereby permitting a bicycle frame member to be placed upon said bicycle-engaging surface in said open configuration, said retaining strap being sufficiently flexible to be bent across said bicycle-engaging surface to retain a bicycle frame thereon, said strap including a fastener for fastening said retaining strap in a bicycle frame-retaining configuration.

3. The invention as recited in claim 2 wherein said base includes a round-shaped through-hole through which a round-shaped bicycle carrier support arm is extendable, said round-shaped through-hole being adapted for a snug frictional fit between said base and such a support arm so that said base is slidable along the support arm and is restrainable in a position upon the support arm by the friction fit.

4. The invention as recited in claim 2 wherein said restraining strap further comprises a series of apertures located along a length thereof, each of said apertures being substantially rectangular in shape.

5. A bicycle carrier adapted to be mounted on a vehicle comprising:

a mounting frame securable to a vehicle;

a pair of bicycle support arms projecting from said mounting frame; and at least one cradle mounted on at least one of said support arms for cradling a bicycle frame, said at least one cradle having portions comprised of a flexible material including a base mounted on a respective support arm, and a self-supporting and substantially upstanding retaining strap, said base forming a bicycle-engaging surface and including first fastening means, said strap being one piece construction with said base and at least a portion of said strap normally extending upwardly form said base to permit a bicycle to be inserted onto said bicycle-engaging surface, said strap being flexible to be bent across said bicycle-engaging surface to retain a bicycle frame thereon, said strap including second fastening means engageable with said first fastening means for fastening said strap in its bicycle frame-retaining position.

6. The invention as recited in claim 5 wherein said base further comprises:

a round-shaped through-hole through which a round-shaped support arm extends, said base being slidable along said support arm.

7. A bicycle carrier adapted to be mounted on a vehicle comprising:

a mounting frame securable to a vehicle;

a pair of bicycle support arms projecting from said mounting frame; and at least one holder mounted on at least one of said support arms for securing a bicycle, said at least one holder comprising:

a cradle adapted for cradling a bicycle frame on a base of said cradle, said base having a substantially upwardly open bicycle-engaging surface; and a self-supporting and substantially upstanding retaining strap at least partially extending upwardly from said base and positioned away from said base in an open configuration thereby permitting a bicycle to be inserted onto said bicycle-engaging surface in said open configuration, said retaining strap being sufficiently flexible to be bent across said bicycle-engaging surface to retain a bicycle frame thereon, said strap including a fastener for fastening said retaining strap in a bicycle frame-retaining configuration.

\* \* \* \* \*